United States Patent Office 3,525,259
Patented Aug. 25, 1970

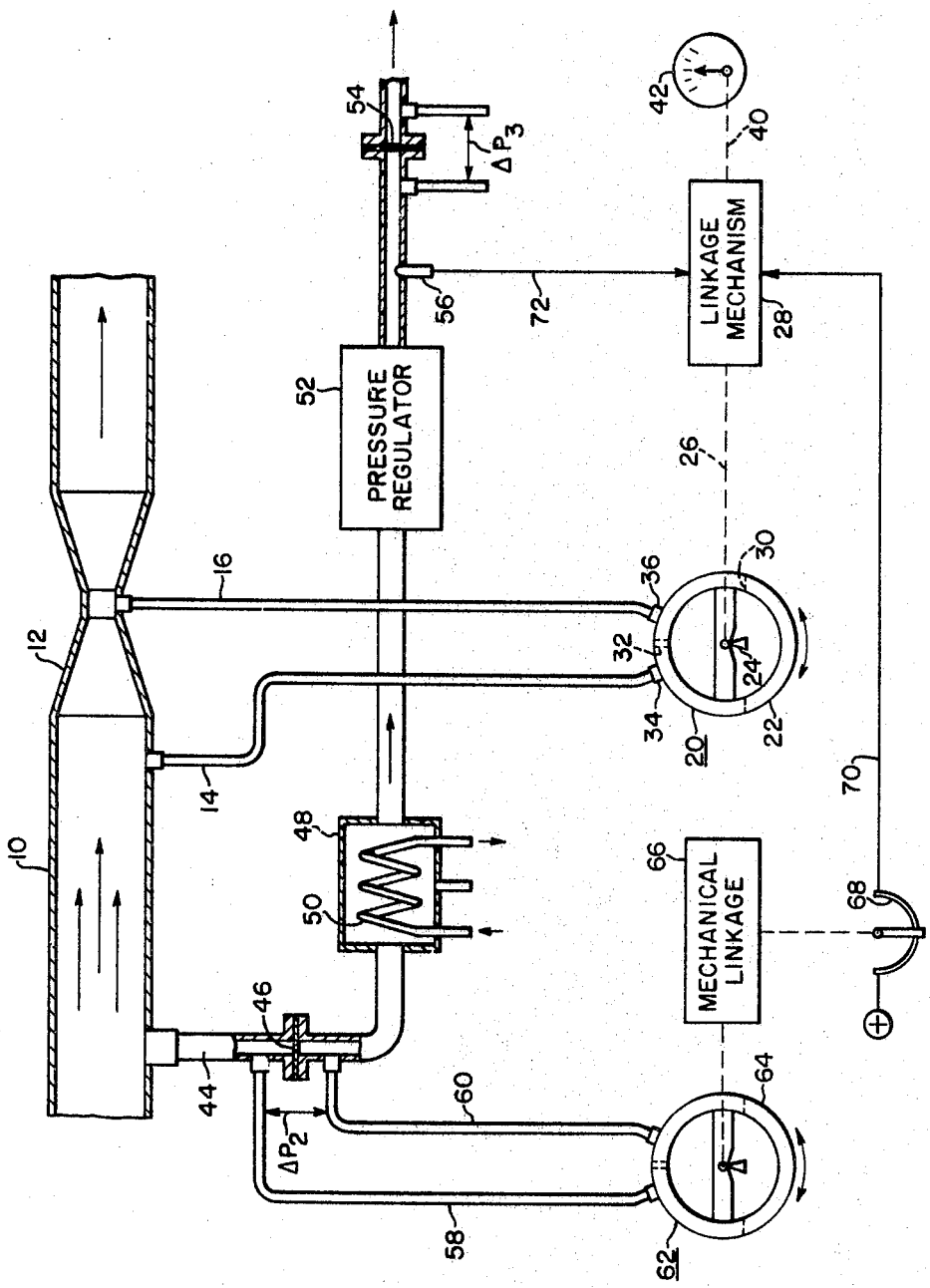

3,525,259
GAS FLOW MEASUREMENT SYSTEM
Donald M. Stough, Crafton, Pittsburgh, Pa., assignor to Westinghouse Electric Corporation, Pittsburgh, Pa., a corporation of Pennsylvania
Filed Nov. 6, 1967, Ser. No. 680,864
Int. Cl. G01f 1/08
U.S. Cl. 73—196            6 Claims

ABSTRACT OF THE DISCLOSURE

A system for measuring the effective dry gas flow rate of a stream of gas containing varying amounts of moisture, characterized in that moisture variations are measured and compensated for by removing the moisture from a sample of the gas such that variations in the moisture will be a function of the ratio of flow rates before and after removal of the moisture in the sample. This ratio is then utilized to vary the flow rate reading of the main stream of moisture-containing gas.

BACKGROUND OF THE INVENTION

As is known, it is often necessary to measure the flow rate of combustible gases or the like where it is primarily desired to determine the total B.t.u. content of the gas. Such gases may contain varying amounts of moisture; and as the moisture content and density varies, the flow rate will also vary even though the dry gas content of the overall gas mixture may be constant. In most cases, it is impractical to remove the moisture content from the main gas stream by condensation; and in the past no practical means has been developed for compensating for moisture variations in the flow rate reading.

SUMMARY OF THE INVENTION

As an overall object, the present invention provides a new and improved system for measuring the effective dry gas flow rate of a stream of gas containing varying amounts of moisture.

Another object of the invention is to provide a system of the type described wherein an auxiliary conduit is connected to a main gas-conveying conduit, and the moisture is removed from the gas in this auxiliary conduit such that the ratio of the flow rates of the gas in the auxiliary conduit before and after removal of moisture may be utilized to vary the gas flow reading obtained from the main conduit and thereby compensate for moisture variations.

In accordance with the invention, a gas flow measuring system for gases passing through a main conduit and containing varying amounts of moisture is provided, comprising means for measuring the differential pressure created as the gas flows through a restriction in the main conduit, an auxiliary conduit connected to the main conduit such that a portion of the gases in the main conduit are diverted to the auxiliary conduit, means for condensing and removing moisture in gas flowing through the auxiliary conduit, apparatus for measuring the ratio of the flow rates of the gas in the auxiliary conduit before and after removal of moisture, and means responsive to the ratio thus obtained and said differential pressure measured as the gas flows through a restriction in the main conduit for determining the flow rate of dry gas only in said main conduit.

Preferably, the ratio of the flow rates of the gas in the auxiliary conduit before and after removal of moisture is determined by regulating the pressure of the gas in the auxiliary conduit, after removal of moisture, to a constant value. In this manner, moisture variations will be a function of the ratio of flow rate before condensation to the flow rate after condensation. Since the flow rate after condensation is maintained constant, the moisture variations will be included in variations in the flow rate before condensation and can be utilized to vary the main flow rate in the manner described above.

The above and other objects and features of the invention will become apparent from the following detailed description taken in connection with the accompanying drawing.

BRIEF DESCRIPTION OF THE DRAWING

The single figure schematically illustrates a gas flow measurement system which is arranged in accordance with the principles of the invention.

DESCRIPTION OF THE PREFERRED EMBODIMENT

With reference now to the drawing, gas flowing through a main conduit 10 passes through a Venturi or restricted orifice 12. Connected to the conduit 10, on either side of the Venturi 12 are conduits 14 and 16. These conduits, in turn, are connected to a ring balance meter, generally indicated by the reference numeral 20. The ring balance meter 20 may be of the type manufactured by Hagan Controls in Pittsburgh, Pennsylvania and described in their Product Bulletin PB–105–510. The basic assembly of the ring balance meter 20 consists of a hollow ring sensing element 22 balanced on a knife-edge fulcrum 24. The ring 22, in turn, is connected through a mechanical linkage 26 to a spring and linkage mechanism 28 which tends to maintain the ring 22 in the upright position shown. The ring 22 is hollow and contains a sealing fluid up to the level indicated by the reference numeral 30; while a partition 32 separates the high and low pressure connections 34 and 36. With this arrangement, a differential pressure across the partition 32 will produce a torque on the ring 22, causing it to rotate on its fulcrum 24. As the ring rotates, its movement is resisted by the spring mechanism 28 until a balance is achieved between the torque produced by the differential pressure measurement and the resulting torque produced by the spring in mechanism 28. The mechanism 28, in turn, is connected through linkage 40 to the dial of a meter 42 designed to indicate the rate of flow.

As is known, the flow rate through the conduit 10 is proportional to the square root of the differential pressure produced across the restriction 12. Thus:

$$(1) \qquad Q = K\sqrt{\Delta P/W}$$

where:

Q=flow rate,
K=a constant determined by the parameters of the system,
$\Delta P$=differential pressure between conduits 14 and 16, and
W=specific weight of the gas.

It can be seen, therefore, that as the specific weight of the gas changes due to variations in moisture content or the like, the flow rate will also vary, notwithstanding the fact that the amount of dry gas in the stream may not vary. The ring balance motion itself extracts the square root of the differential in pressure between conduits 14 and 16; and ordinarily this factor is indicated on the meter 42 as flow rate. However, as the moisture content changes and, hence, the specific density of the gas changes, erroneous variations in flow rate will also occur.

In order to compensate for this, a sample of the gas in conduit 10 is supplied to an auxiliary conduit 44 where it passes through a first restricted orifice 46 and thence through a condensing chamber 48 containing a cooling coil 50. In chamber 48, the water within the gas will condense whereby the gas issuing from the chamber 48 is moisture-free. From the chamber 48, the gas passes through a pressure regulator 52 and thence through a second restricted orifice 54.

If the pressure differential across orifice 46 is denoted as $\Delta P_2$ and that across orifice 54 as $\Delta P_3$, moisture variations will then be reflected as a ratio of $\Delta P_2$ to $\Delta P_3$. Since, however, $\Delta P_3$ is maintained constant by virtue of the pressure regulator 52, moisture variations, as well as temperature variations, will be included in the quantity $\Delta P_2$ such that a correction applied to the main flow rate reading by multiplying the main flow differential $\Delta P$ by $\Delta P_3/P_3$ will produce a corrected measurement. For linear flow measurement, flow, Q, then becomes:

$$(II) \qquad Q = K\sqrt{\Delta P} \cdot \frac{K'}{\sqrt{\Delta P_2}} \cdot \frac{K''}{\sqrt{T_3}}$$

where:

K, K' and K'' are constants, and
$T_3$ is the temperature of the gas flowing from the pressure regulator 52.

The temperature $T_3$ is applied to correct for sample temperature variations and is derived by means of a temperature sensing element 56 such as a resistance element, thermocouple or the like.

The differential in pressure across the restricted orifice 46 is applied via conduits 58 and 60 to a second ring balance meter 62 similar in operation to the ring balance meter 20 previously described. The motion of the ring 64 of ring balance meter 62 will, through a mechanical linkage 66, produce a mechanical movement proportional to the square root of $\Delta P_2$. This mechanical movement, in turn, may be applied to the movable tap on a potentiometer 68 which will produce an electrical signal on lead 70 proportional to the square root of $\Delta P_2$. Alternatively, a pneumatic signal proportional to $\Delta P_2$ may be obtained via the mechanical linkage 66.

The electrical signal on lead 70 proportional to the square root of $\Delta P_2$ is then applied to the mechanism 28 in the ring balance meter 20 along with an electrical signal from temperature sensing element 56 on lead 72 which is modified to produce an electrical signal proportional to the square root of the quantity $T_3$. The two electrical signals are preferably utilized to drive motors which, in turn, actuate linkages in the mechanical linkage mechanism 28 to satisfy Equation II given above. Hence, the indication on meter 42 will now be a true indication of the dry gas flow rate irrespective of variations in the moisture content of the gas flowing through conduit 10.

Although the invention has been shown in connection with a certain specific embodiment, it will be readily apparent to those skilled in the art that various changes in form and arrangement of parts may be made to suit requirements without departing from the spirit and scope of the invention.

I claim as my invention:
1. In a gas flow measuring system for gases passing through a main conduit and containing varying amounts of moisture, the combination of means for measuring the differential pressure created as the gas flows through a restriction in the main conduit, an auxiliary conduit connected between said main conduit and a region of substantially constant pressure such that a portion of the gases in the main conduit will flow through the auxiliary conduit, means for condensing and removing moisture in gas flowing through the auxiliary conduit, means for measuring the differential pressure across a single restricted orifice in said auxiliary conduit at a point before condensation of moisture therein, a pressure regulator in said auxiliary conduit at a point beyond said condensing means, means for deriving the square root of the differential in pressure across said single restricted orifice in the auxiliary conduit, means for deriving the square root of the differential in pressure across said restriction in the main conduit, and means responsive to the square root values thus obtained for determining the flow rate of dry gas only in said main conduit.

2. The gas flow measuring system of claim 1 wherein said auxiliary conduit is connected to the main conduit at a point ahead of said restriction in the main conduit along the path of flow of fluid therein.

3. The gas flow measuring system of claim 1 wherein the means for removing moisture from the gas in said auxiliary conduit comprises a condensation chamber between said restricted orifice in the auxiliary conduit and said pressure regulator.

4. The gas flow measuring system of claim 1 wherein the means for measuring the differential pressure in said main and auxiliary conduits comprises ring balance meters.

5. The gas flow measuring system of claim 4 wherein the output of the ring balance meter operatively connected to said auxiliary conduit is utilized to vary the reading of the ring balance meter operatively connected to the main conduit to thereby compensate for moisture variations in the main conduit.

6. The gas flow measuring system of claim 1 including means for measuring the temperature of the gas in said auxiliary conduit, said means for determining the flow rate of gas in said main conduit being also responsive to the temperature of the gas in the auxiliary conduit thus measured.

References Cited
UNITED STATES PATENTS

| | | | |
|---|---|---|---|
| 1,924,468 | 8/1933 | Stone | 73—196 XR |
| 1,947,370 | 2/1934 | Zoll | 73—205 |
| 2,570,410 | 10/1951 | Vetter. | |

JAMES J. GILL, Primary Examiner

U.S. Cl. X.R.
73—205